United States Patent [19]

Kano

[11] Patent Number: 5,795,501
[45] Date of Patent: Aug. 18, 1998

[54] ELECTRICALLY-CONDUCTIVE COMPOSITION

[75] Inventor: Haruhiko Kano, Muko, Japan

[73] Assignee: Murata Manufacturing Co., Ltd., Japan

[21] Appl. No.: 711,806

[22] Filed: Sep. 10, 1996

[30] Foreign Application Priority Data

Sep. 22, 1995 [JP] Japan ................... 7-244728

[51] Int. Cl.⁶ .............. H01B 1/02; H01B 1/16; H01B 1/22
[52] U.S. Cl. .............. 252/514; 106/1.19
[58] Field of Search ............... 252/514, 518, 252/519.21, 519.3, 521.2; 106/1.19

[56] References Cited

U.S. PATENT DOCUMENTS

| | | |
|---|---|---|
| 4,446,059 | 5/1984 | Eustice .................... 252/514 |
| 5,162,062 | 11/1992 | Carroll et al. .............. 148/24 |
| 5,378,408 | 1/1995 | Carroll et al. .............. 252/514 |
| 5,616,173 | 4/1997 | Okamoto et al. ............ 106/117 |

FOREIGN PATENT DOCUMENTS

| | | |
|---|---|---|
| 57-41763 | 9/1982 | Japan. |
| 60-176948 | 9/1985 | Japan. |
| 62-285314 | 12/1987 | Japan. |
| 1258303 | 10/1989 | Japan. |
| 1258304 | 10/1989 | Japan. |
| 1258305 | 10/1989 | Japan. |
| 8148032 | 6/1996 | Japan. |

*Primary Examiner*—Mark Kopec
*Attorney, Agent, or Firm*—Osterlenk, Faber, Gerb & Soffen, LLP

[57] ABSTRACT

Disclosed is an electrically-conductive composition suitable for hot wire heaters which take on a dark brown color instead of an amber color of silver. The composition comprises (A) silver powder, (B) glass frit, (C) rhodium or compound thereof, (D) inorganic pigment, and (E) organic vehicle.

13 Claims, 1 Drawing Sheet

ELECTRICALLY-CONDUCTIVE COMPOSITION

BACKGROUND OF THE INVENTION

1. Field of the Invention

The present invention relates to an electrically-conductive composition.

2. Description of the Related Art

Hot wire heaters (so-called defrosters) having a striped pattern have been widely used for defogging or defrosting automotive window glasses. A silver paste which is used for the hot wire heater is composed of silver powder, glass frit, inorganic pigment, and organic vehicle. To form the hot wire heater, this silver paste is applied to the window glass by printing which is followed by baking.

As a result of being produced by the float process, the automotive window glass has a thin film of tin on one side. A hot wire heater formed on the tin-coated side takes on an amber color, whereas that formed on the tin-free side takes on a yellow color due to a silver colloid which has diffused into glass. Forming the hot wire heater on the tin-coated side is common practice at the present time.

In the early days when the hot wire heater was considered optional equipment for prestige cars, the heater's conspicuousness was considered to be a symbol of prestige. The recent wide spread of the hot wire heater as standard equipment today, however, has aroused a demand for an invisible appearance rather than a conspicuous one.

In practice, however, it has been difficult to make the hot wire heater invisible because it takes on an amber color so long as it is made from the conventional electrically-conductive composition. The present invention was completed to address the above-mentioned problem.

SUMMARY OF THE INVENTION

It is an object of the present invention to provide an electrically-conductive composition suitable for the hot wire heater which takes on a dark brown color instead of an amber color.

The gist of the present invention resides in an electrically-conductive composition which comprises (A) silver powder, (B) glass frit, (C) organorhodium compound, (D) inorganic pigment, and (E) organic vehicle.

In a preferred embodiment of the present invention, the inorganic pigment (D) is composed of at least two of copper oxide, manganese oxide, iron oxide, and chromium oxide.

In another preferred embodiment of the present invention, the inorganic pigment is a mixture of copper oxide, manganese oxide and iron oxide, or a mixture of copper oxide and chromium oxide, or a combination of the two mixtures.

In a preferred embodiment of the present invention, the amount of the organorhodium compound (C) is about 0.00001–0.0001 part by weight (in terms of metallic rhodium) for 100 parts by weight of the silver powder (A).

In another preferred embodiment of the present invention, the amount of the glass frit (B) is about 0.5–10 parts by weight, the amount of the inorganic pigment (D) is about 1–5 parts by weight, and the amount of the organic vehicle (E) is about 10–40 parts by weight respectively for 100 parts by weight of the silver powder (A).

According to the present invention, the electrically-conductive composition of the present invention yields hot wire heaters which take on a dark brown color. Such hot wire heaters are less conspicuous than conventional ones and hence desirable from the view point of design when they are used for automobiles.

DESCRIPTION OF THE INVENTION

Figure 1:
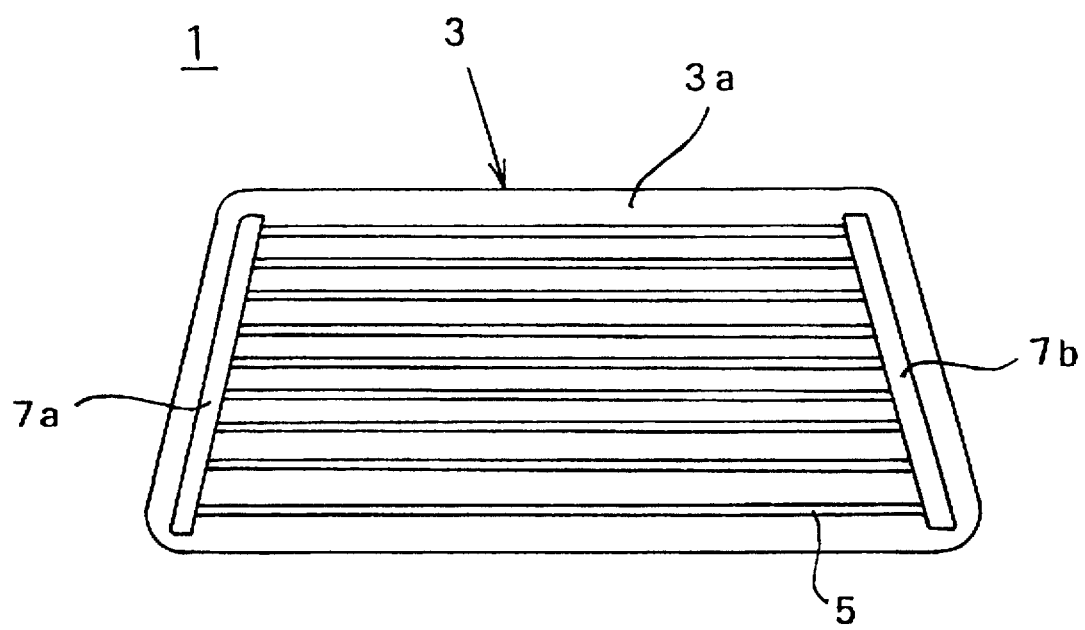
FIG. 1 is a schematic diagram showing an automotive window glass on which a hot wire heater is formed with the electrically-conductive composition according to the present invention.

The electrically-conductive composition of the present invention comprises (A) silver powder, (B) glass frit, (C) rhodium or a compound thereof, preferably an organorhodium compound, (D) inorganic pigment, and (E) organic vehicle.

The silver powder (A) used in the present invention is not specifically limited in particle shape and diameter. It may be composed of spherical particles or flake-shaped particles or both. In the case of spherical particles, the average particle diameter should preferably be about 0.1 to 5 µm. An excessively fine powder is liable to overbake which causes stress to glass, and an excessively coarse powder gives rise to a porous product which is poor in tensile strength. In the case of flake-shaped particles, the SEM average particle diameter should preferably be about 3 to 10 µm. An excessively fine powder yields a baked product which does not take on a desired dark brown color due to low reflection of visible light. An excessively coarse powder yields a baked product which is poor in tensile strength due to incomplete baking.

The glass frit (B) used in the present invention functions to firmly bond, after baking, the hot wire heater to the automotive window glass on which it is formed. The glass frit is not specifically restricted in composition so long as it is flowable in the vicinity of the melting point of the window glass. Preferred examples include those which are made from lead borosilicate glass (softening point: 380°–650° C.), zinc borosilicate glass (softening point: 470°–650° C.), and bismuth borosilicate glass (softening point: 430°–650° C.).

The amount of the glass frit varies depending on the substrate to which the electrically-conductive composition is applied. It is usually about 0.5 to 10 parts by weight for 100 parts by weight of silver powder if the conductive composition is used for automotive hot wire heaters and preferably about 1.5 to 6 parts per hundred (pph) silver. With an amount less than specified above, the glass frit gives rise to hot wires which are poor in tensile strength. With an amount more than specified above, the glass frit gives rise to hot wires which are poor in solderability.

The organorhodium compound (C) used in the present invention functions to impart a stable dark brown color to the electrically-conductive composition after its baking on the window glass. Upon baking, it yields an oxide colloid which darkens the amber color of silver. The nature of the compound (C) is not restricted. Typical examples include the resinate, mercaptide, naphthenate and abietate of rhodium and the like.

The amount of the organorhodium compound varies depending on the substrate to which the electrically-conductive composition is applied. It is preferably about 0.00001–0.0001 part by weight (in terms of metallic rhodium) for 100 parts by weight of silver powder if the conductive composition is used for automotive hot wire heaters. It is more preferable that about 0.00005 to 0.00008 part of the organorhodium compound per hundred weight parts of silver is employed. With an amount less than specified above, the organorhodium compound does not fully produce the effect of darkening the color. With an amount more than specified above, the organorhodium compound increases the resistivity of the hot wires without the desired additional effect of darkening the color.

Metallic rhodium or rhodium oxide could be employed in the conductive composition of the present invention. In such a case, it is very important to measure the small amount of the rhodium or rhodium oxide precisely and disperse it uniformly in the conductive composition. It is therefore preferable to employ the organorhodium compound because of its easy dispersion and measurability.

The inorganic pigment (D) used in the present invention functions to complement the effect of the organorhodium compound (C). In other words, it imparts a desired dark brown color to the conductive composition after its baking on the window glass. Examples of the inorganic pigment include copper oxide, manganese oxide, iron oxide and chromium oxide which are used in combination with one another. A preferred example of the inorganic pigment is a mixture of copper oxide, manganese oxide and iron oxide, or a mixture of copper oxide and chromium oxide, or a combination of the two mixtures. These oxides are black pigments, and they impart a dark brown color to the conductive composition baked on the window glass.

The amount of the inorganic pigment varies depending on the substrate to which the electrically-conductive composition is applied. It is usually about 1 to 5 parts and preferably about 3 to 5 parts by weight for 100 parts by weight of silver powder if the conductive composition is used for automotive hot wire heaters. With an amount less than specified above, the inorganic pigment does not impart the desired dark brown color even when it is used in combination with the organorhodium compound. With an amount more than specified above, the inorganic pigment produces the desired color even when it is used alone but it gives rise to hot wires which are poor in solderability.

The organic vehicle (E) used in the present invention functions to make the mixture of the above-mentioned four components, that is, (A) silver powder, (B) glass frit, (C) organorhodium compound, and (D) inorganic pigment, pasty. It is not specifically restricted. It may be composed of a resin component, such as ethyl cellulose, nitrocellulose, and alkyd resin, and an organic solvent, such as terpineol, butyl carbitol, and carbitol acetate, in an amount enough to give a resin concentration of about 1–40% and preferably about 5 to 30%.

The amount of the organic vehicle varies depending on the application of the electrically-conductive composition. In the case where the conductive composition is used for automotive hot wire heaters, a desired amount is about 10–40 parts by weight for 100 parts by weight of silver powder, preferably about 12 to 30 pph. in the composition. An amount less than specified above is not enough to make the mixture pasty as desired. An amount more than specified above leads to a relatively low concentration of silver and hence the resulting hot wires are poor in strength due to solder corrosion.

The electrically-conductive composition of the present invention may optionally have incorporated with an organonickel or organoplatinum compound, e.g. a resinate, mercaptide, naphthenate and abietate, so as to increase its resistivity to a desired level without any adverse effect on color, solderability, and terminal tensile strength. The amount of the resistivity adjusting compound varies depending on the application of the electrically-conductive composition. In the case where the conductive composition is used for automotive hot wire heaters, a desired amount is about 0.1 to 5 parts by weight (in terms of metal) for 100 parts by weight of silver powder in the composition and preferably about 0.3 to 3 pph. An amount less than specified above is not enough to increase the resistivity as desired. An amount more than specified above leads to incomplete baking of silver and hence the resulting hot wires are poor in strength due to severe solder corrosion.

The electrically-conductive composition of the present invention can be easily produced by mixing the above-mentioned components and kneading the mixture into a paste. Upon printing and baking, it forms a conductor on glass. When viewed through the tin-coated side of glass, the conductor takes on a brown color which is darker than the amber color of the conventional silver conductor. In addition, the conductor permits complete soldering at the terminals, giving a tensile strength higher than 100N. The resistivity of the conductor fluctuates within only ±5% in a life test at high temperatures and high humidity. This fluctuation is small enough to enable practical use.

The electrically-conductive composition of the present invention may be made into the hot wire defogger or defroster on the automotive window glass by any method applicable to the conventional electrically-conductive composition. For example, it may be applied to the window glass by screen printing and the printed pattern dried at 130° to 180° C. for 5 to 10 minutes and then baked at 600° to 700° C. for 1 to 5 minutes. The resulting hot wire heater produced in this manner takes on a dark brown color when viewed from outside the car.

To further illustrate the invention, and not by way of limitation, the following examples are given.

EXAMPLES 1 TO 10 AND REFERENTIAL EXAMPLES 1 TO 3

An electrically-conductive composition was prepared from the following components.

(A) 100 parts by weight of silver powder composed of 20 wt % of spherical particles of (0.1–0.5 μm in average diameter, 50 wt % of spherical particles of 1–3 μm in average diameter, and 30 wt % of platy particles (3–6 μm in average diameter).

(B) 5 parts by weight of lead borosilicate glass frit having a softening point of 460° C.

(C) Organorhodium compound (rhodium resinate) in varied amounts as shown in Table 1.

(D) Black inorganic pigment composed of CuO, $MnO_2$ and $Fe_2O_3$ or composed of CuO and $Cr_2O_3$ in varied amounts as shown in Table 1.

(E) 25 parts by weight of organic vehicle containing 10% ethyl cellulose dissolved in terpineol.

The compositions in Examples 5 to 7 also had incorporated in them an organonickel compound (nickel resinate) or organoplatinum compound (platinum resinate) or both to increase the resistivity in an amount as shown in Table 1.

TABLE 1

| Ex. No. | Inorganic pigment (pbw) | | Resistivity adjuster (pbw)* | | Organorhodium compound (pbw)* |
|---|---|---|---|---|---|
| | CuO—MnO$_2$—Fe$_2$O$_3$ | CuO—Cr$_2$O$_3$ | Organonickel compound | Organoplatinum compound | |
| 1 | 5 | — | — | — | 0.00002 |
| 2 | 5 | — | — | — | 0.00008 |
| 3 | — | 5 | — | — | 0.00005 |
| 4 | 3 | 2 | — | — | 0.00005 |
| 5 | 3 | 2 | 3 | — | 0.00005 |
| 6 | 3 | 2 | — | 1 | 0.00005 |
| 7 | 2 | 3 | 2 | 1 | 0.00005 |
| 8 | 6 | — | — | — | 0.00005 |
| 9 | — | 6 | — | — | 0.00005 |
| 10 | 3 | 3 | — | — | 0.00005 |
| (1)** | 5 | — | — | — | — |
| (2) | — | 5 | — | — | — |
| (3) | 2 | 3 | — | — | — |

*In terms of metal.
**Referential Example Nos. are parenthesized.

The samples in the Referential Examples contain the same silver powder, glass frit, and organic vehicle as used in Examples 1 to 10 but do not contain the organorhodium compound.

To prepare the electrically-conductive composition, these components were mixed and the mixture was kneaded into a paste. The resulting pasty composition was applied by screen printing to an automotive window glass 3 to form thereon a striped pattern as shown in FIG. 1. The window glass was one which was produced by the float process, and the pattern was formed on the tin-coated side 3a. The striped pattern was composed of eight parallel lines 5, each 0.4 mm wide and 200 mm long on average. The ends of the lines were connected to bus bars 7a, 7b. The screen printing process was followed by baking at 680° C. for 3 minutes. Thus there was obtained the hot wire heater 1.

The resulting hot wire heaters were tested for color, resistivity, solderability, tensile strength at terminals, strength life, and change in resistivity. The results are shown in Table 2.

To evaluate color, the hot wire heater 1 was visually observed from the back (non-tin) side. Samples were rated "good" or "poor" depending on whether or not they took on a dark brown color. All the samples in Examples 1 to 10 were satisfactory in color. By contrast, all the samples in Referential Examples 1 to 3 were poor in color. They did not take on a dark brown color because of the lack of organorhodium compound. Since the samples in Referential Examples 1 to 3 failed to achieve the object of the present invention, they were not tested for the other characteristic properties.

Resistivity was calculated from the resistance between the bus bars 7a, 7b and the thickness of the eight lines 5.

Solderability was evaluated by soldering a tin-plated brass terminal to the bus bars 7a, 7b, with the soldering area being limited to 3 mm square. Solderability was rated as "good" if more than 80% of the soldering area was covered with solder; otherwise, it was rated as "poor".

The soldered terminals were also tested for tensile strength. Samples in Examples 1 to 7 were satisfactory in solderability and tensile strength (greater than 100N). By contrast, the samples in Examples 8 to 10 were poor in solderability because they contain the inorganic pigment in an excess amount (more than 5 pbw). Being poor in solderability, the samples in Examples 8 to 10 were not tested for other characteristic properties.

TABLE 2

| Ex. No. | Color | Resistivity (μΩ-cm) | Solderability | Terminal tensile strength (N) | Strength life (N) | Change in resisitivity (%) |
|---|---|---|---|---|---|---|
| 1 | good | 3.0 | good | 180 | 130 | 3.0 |
| 2 | good | 3.3 | good | 160 | 120 | 3.5 |
| 3 | good | 2.5 | good | >200 | 160 | −1.5 |
| 4 | good | 2.8 | good | 190 | 140 | −1.0 |
| 5 | good | 10.0 | good | 150 | 120 | 2.5 |
| 6 | good | 7.0 | good | 190 | 150 | −1.0 |
| 7 | good | 12.0 | good | 170 | 130 | 3.0 |
| 8 | good | 4.0 | poor | — | — | — |
| 9 | good | 3.0 | poor | — | — | — |
| 10 | good | 3.5 | poor | — | — | — |
| (1) | poor | 3.0 | — | — | — | — |
| (2) | poor | 3.3 | — | — | — | — |
| (3) | poor | 2.7 | — | — | — | — |

To evaluate the strength life and the change in resistivity, the soldered samples were allowed to stand in a thermo-hydrostat at 60° C. and 95% RH. Strength measured after aging for 4 weeks was regarded as "strength life" and the change in resistivity was calculated from resistivity measured after aging for 1000 hours. The results proved the samples' reliability of strength and resistivity. Samples in Examples 1 to 7 showed almost no sign of degradation, with satisfactory strength life and a small change in resistivity (within ±5%).

It is concluded that the samples in Examples 1 to 7 are satisfactory for practical use in color, solderability, terminal tensile strength, strength life, and change in resistivity, and that samples in Examples 8 to 10 are good in color but poor in solderability. The samples in Referential Examples 1 to 3 were poor in color and hence do not achieve the object of the present invention.

What is claimed is:

1. An electrically-conductive composition which comprises (A) silver powder, (B) glass frit, (C) rhodium or a compound thereof, (D) inorganic pigment which is at least two members of the group consisting of copper oxide, manganese oxide, iron oxide and chromium oxide, and (E) organic vehicle, wherein the amount of rhodium compound is about 0.00001–0.0001 parts by weight (in terms of metallic rhodium) for 100 parts by weight of the silver powder.

2. An electrically-conductive composition as defined in claim 1, wherein (C) is an organorhodium compound.

3. An electrically-conductive composition as defined in claim 2, wherein the inorganic pigment (D) is (a) a mixture of copper oxide, manganese oxide and iron oxide, (b) a mixture of copper oxide and chromium oxide, or (c) a combination of mixtures (a) and (b).

4. An electrically-conductive composition as defined in claim 3, wherein the amount of the glass frit (B) is about 0.5–10 parts by weight, the amount of the inorganic pigment (D) is about 1–5 parts by weight, and the amount of the organic vehicle (E) is about 10–40 parts by weight, respectively, for 100 parts by weight of the silver powder (A).

5. An electrically-conductive composition as defined in claim 4, wherein the amount of the organorhodium compound (C) is about 0.00005–0.00008 part by weight (in terms of metallic rhodium) for 100 parts by weight of the silver powder (A), the amount of the glass frit (B) is about 1.5–6 parts by weight, the amount of the inorganic pigment (b) is about 3–5 parts by weight, and the amount of the organic vehicle (E) is about 12–30 parts by weight, respectively, for 100 parts by weight of the silver powder (A).

6. An electrically-conductive composition as defined in claim 1, wherein the amount of the glass frit (B) is about 0.5–10 parts by weight, the amount of the inorganic pigment (D) is about 1–5 parts by weight, and the amount of the organic vehicle (E) is about 10–40 parts by weight, respectively, for 100 parts by weight of the silver powder (A).

7. An electrically-conductive composition as defined in claim 2, wherein the amount of the glass frit (B) is about 0.5–10 parts by weight, the amount of the inorganic pigment (D) is about 1–5 parts by weight, and the amount of the organic vehicle (E) is about 10–40 parts by weight, respectively, for 100 parts by weight of the silver powder (A).

8. An electrically-conductive composition as defined in claim 1, wherein the amount of the organorhodium compound (C) is about 0.00005–0.00008 part by weight (in terms of metallic rhodium) for 100 parts by weight of the silver powder (A).

9. An electrically-conductive composition as defined in claim 2, wherein the amount of the organorhodium compound (C) is about 0.00005–0.00008 part by weight (in terms of metallic rhodium) for 100 parts by weight of the silver powder (A).

10. An electrically-conductive composition as defined in claim 1, wherein the inorganic pigment (D) is a mixture of (a) copper oxide, manganese oxide and iron oxide, (b) a mixture of copper oxide and chromium oxide, or (c) a combination of the mixtures (a) and (b).

11. An electrically-conductive composition as defined in claim 3, wherein the amount of the glass frit (B) is about 1.5–6 parts by weight, the amount of the inorganic pigment (D) is about 3–5 parts by weight, and the amount of the organic vehicle (E) is about 12–30 parts by weight, respectively, for 100 parts by weight of the silver powder (A).

12. An electrically-conductive composition which comprises (A) 100 parts of silver powder, (B) about 0.5–10 parts of borosilicate glass frit, (C) about 0.00005–0.0001 part (in terms of metallic rhodium) of organorhodium compound selected from the group consisting of resinate, mercaptide, naphthenate and abietate, (D) about 1–5 parts inorganic pigment, and (E) about 10–40 parts organic vehicle.

13. An electrically-conductive composition as defined in claim 12, wherein the amount of glass frit (B) is about 1.5–6 parts, the amount of the organorhodium compound (C) is about 0.00005–0.00008 part, the amount of the inorganic pigment is about 3–5 parts and the amount of organic vehicle is about 12–30 parts.

* * * * *